United States Patent
Jones et al.

(10) Patent No.: US 6,501,067 B2
(45) Date of Patent: Dec. 31, 2002

(54) ISOLATION PAD FOR PROTECTING SENSING DEVICES ON THE OUTSIDE OF A CONDUIT

(75) Inventors: Richard T. Jones, Hamden, CT (US); Allen R. Davis, Falls Church, VA (US); John M. Faustino, East Haven, CT (US)

(73) Assignee: Weatherford/Lamb, Inc., Houston, TX (US)

(*) Notice: Subject to any disclaimer, the term of this patent is extended or adjusted under 35 U.S.C. 154(b) by 150 days.

(21) Appl. No.: 09/726,060

(22) Filed: Nov. 29, 2000

(65) Prior Publication Data

US 2002/0063200 A1 May 30, 2002

(51) Int. Cl.$^7$ .............................. G01J 1/04; G01J 1/42
(52) U.S. Cl. ......................... 250/227.14; 250/227.16; 250/227.23; 250/227.25; 73/705; 285/13
(58) Field of Search ................. 250/227.14, 227.15, 250/227.16, 227.17, 227.18, 227.19, 227.21, 227.23, 227.25; 73/705, 730; 385/12, 13

(56) References Cited

U.S. PATENT DOCUMENTS

| | | | |
|---|---|---|---|
| 3,149,492 A | 9/1964 | Weinberg | 73/393 |
| 4,080,837 A | 3/1978 | Alexander et al. | 73/61 R |
| 4,445,389 A | 5/1984 | Potzick et al. | 73/861.27 |
| 4,515,473 A | 5/1985 | Mermelstein | 356/33 |
| 4,520,320 A | 5/1985 | Potzick et al. | 328/133 |
| 4,706,501 A | 11/1987 | Atkinson et al. | 73/730 |
| 4,724,316 A | 2/1988 | Randall et al. | 250/227 |
| 4,976,151 A | 12/1990 | Morishita | 73/730 |
| 5,024,099 A | 6/1991 | Lee | 73/730 |
| 5,026,823 A * | 6/1991 | Summers et al. | 528/183 |
| 5,031,460 A | 7/1991 | Kanenobu et al. | 73/730 |
| 5,040,415 A | 8/1991 | Barkhoudarian | 73/61 R |
| 5,083,452 A | 1/1992 | Hope | 73/198 |
| 5,218,197 A | 6/1993 | Carroll | 250/227.19 |
| 5,363,342 A | 11/1994 | Layton et al. | 367/149 |
| 5,398,542 A | 3/1995 | Vasbinder | 73/40.5 |
| 5,440,932 A | 8/1995 | Wareham | 73/730 |
| 5,591,922 A | 1/1997 | Segeral et al. | 73/861.04 |
| 5,670,720 A | 9/1997 | Clark et al. | 73/730 |
| 5,741,980 A | 4/1998 | Hill et al. | 73/861.04 |
| 5,844,927 A * | 12/1998 | Kringleboth | 372/6 |
| 5,845,033 A | 12/1998 | Berthold et al. | 385/12 |
| 6,016,702 A * | 1/2000 | Maron | 250/227.14 |
| 6,233,374 B1 * | 5/2001 | Ogle et al. | 250/227.11 |
| 6,354,147 B1 * | 3/2002 | Gysling et al. | 73/579 |

FOREIGN PATENT DOCUMENTS

| | | | |
|---|---|---|---|
| WO | WO 00 13052 | 3/2000 | G02B/6/38 |
| WO | WO 00 00799 | 6/2000 | G01L/11/02 |

OTHER PUBLICATIONS

"Noise and Vibration Control Engineering Principles and Applications", Leo L. Beranek and Istvan L. Ver, A Wiley Interscience Publication, pp. 537–541.

"Mandrel–Wound Fiber Optic Pressure Sensor", P. Ogle, D. Gysling and A. Kersey, Docket CC–0033, pp. 1–22.

CiDRA Presentation on "Flow Meter", Dec. 7–18, 1998, Houston, TX.

"Sound and Sources of Sound", by A. P. Dowling and J. E. Williams, pp. 224–229.

PCT International Search Report for Corresponding International Application PCT/GB01/05286 (citing above–listed references).

* cited by examiner

Primary Examiner—Stephone B. Allen
Assistant Examiner—Bradford Hill
(74) Attorney, Agent, or Firm—Howrey Simon Arnold & White, LLP

(57) ABSTRACT

An apparatus for non-intrusively sensing fluid flow within a pipe is provided. The apparatus includes an array of sensors that include a plurality of optical fiber coils. The array of sensors senses the fluid flow inside the pipe. At least one optical reflective device is disposed between adjacent optical fiber coils. An isolation pad is disposed between each optical reflective device and the pipe.

25 Claims, 1 Drawing Sheet

ISOLATION PAD FOR PROTECTING SENSING DEVICES ON THE OUTSIDE OF A CONDUIT

BACKGROUND OF THE INVENTION

1. Technical Field

This invention relates to fluid flow sensing devices that use fiber optics, and more particularly to those sensing devices that are disposed on the exterior of a conduit.

2. Background Information

In the petroleum industry, there is considerable value in the ability to monitor the flow of petroleum products in the production pipe of a well in real time. Historically, flow parameters such as the bulk velocity of a fluid have been sensed with devices directly disposed within the fluid flow. These type devices have several drawbacks including the fact that they provide an undesirable flow impediment, are subject to the hostile environment within the pipe, and typically provide undesirable potential leak paths into or out of the pipe. Sensors disposed outside the fluid flow pipe avoid these problems, but can be subject to other difficulties stemming from the well environment, which is often characterized by extreme temperatures and pressures. Extreme temperatures can disable and limit the life of electronic components. Sensors disposed outside of the production pipe may also be subject to environmental materials such as water (fresh or salt), steam, mud, sand, etc.

What is needed, therefore, is an apparatus that can protect flow sensing devices that are disposed outside a pipe, and one that can protect sensing devices in a well environment characterized by extreme temperatures and pressures and the presence of debris.

SUMMARY OF THE INVENTION

It is, therefore, an object of the present invention to provide an apparatus for protecting flow sensing devices that are disposed on the exterior of a pipe, and one that can protect sensing devices in a hostile environment.

According to the present invention an apparatus for non-intrusively sensing fluid flow within a pipe is provided. The apparatus includes an array of sensors that include a plurality of optical fiber coils. The array of sensors senses the fluid flow inside the pipe. At least one optical reflective device is disposed between adjacent optical fiber coils. An isolation pad is disposed between each optical reflective device and the pipe.

An advantage of the present invention is that it enables the collection of data pertaining to fluid flow within a pipe in a non-intrusive manner. An externally mounted sensor for non-intrusively sensing fluid flow within the pipe can be subjected to pipe growth and/or vibrations. In those instances where an optical reflective device is utilized with a sensor, the isolation pad isolates the optical reflective device, and splices if used, from thermally or mechanically related pipe growth and/or vibrations. Error or damage that might otherwise be caused by the pipe growth and/or vibrations is thereby decreased to an acceptable level. In some applications, the isolation pad may be used directly under a sensor to protect the sensor.

The present apparatus is also protected from the environment by a compactly formed housing that encloses the array of sensors and the isolation pad. In a well environment, the housing protects the array from fluid and debris that may enter the annulus between the production pipe and the well casing.

The foregoing and other objects, features, and advantages of the present invention will become more apparent in light of the following detailed description of exemplary embodiments thereof.

DETAILED DESCRIPTION OF PREFERRED EMBODIMENTS

Figure 1:
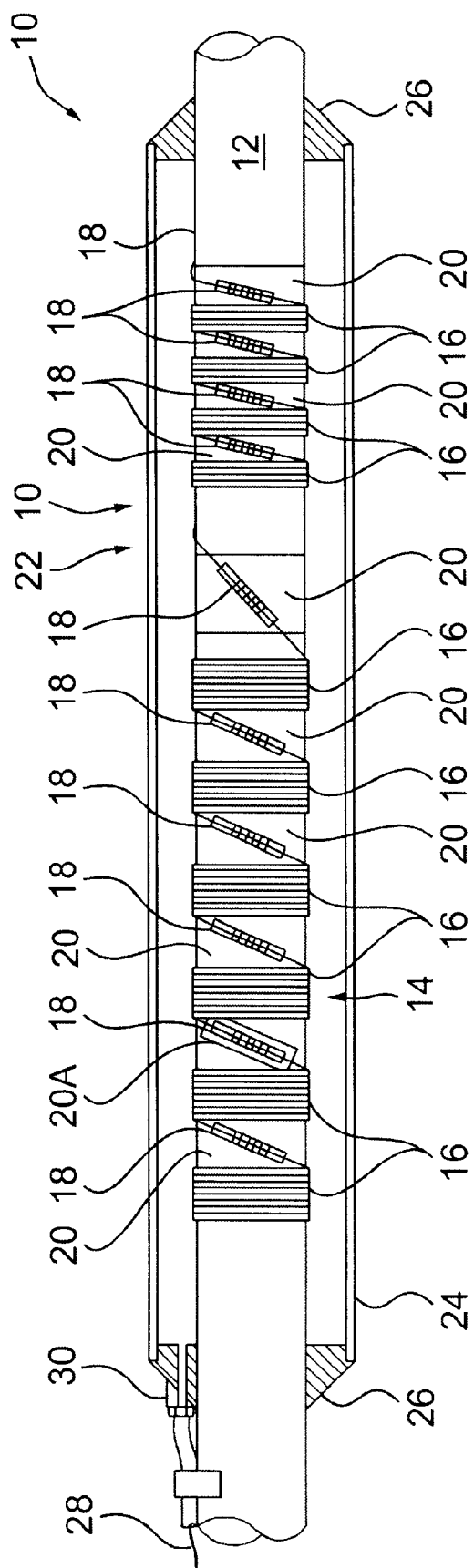
FIG. 1 is a diagrammatic view of the present invention apparatus for non-intrusively sensing fluid flow within a pipe.
Figure 2:
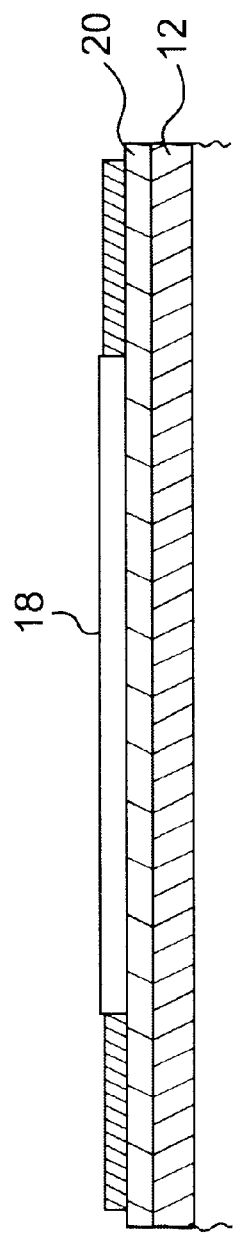
FIG. 2 is a diagrammatic sectional view to illustrate the arrangement of components within the present invention apparatus.

Referring to FIGS. 1–2, an apparatus 10 for non-intrusively sensing fluid flow within a pipe 12 includes an array of sensors 14 that includes a plurality of optical fiber coils 16, one or more optical reflective devices 18, and one or more isolation pads 20. Each optical fiber coil 16 is wrapped multiple turns around the circumference of the pipe 12 in a manner that allows the length of the optical fiber within the coil 16 to change in response to a change in the circumference of the pipe 12. In alternative embodiments, the optical fiber coil 16 is not wrapped around the circumference of the pipe 12, but rather is arranged on the outer surface of the pipe 12. The optical fiber coils 16 may be attached to the pipe 12 by a variety of attachment mechanisms including, but not limited to, adhesive, glue, epoxy, or tape.

The one or more optical reflective devices 18 disposed between coils 16 are wavelength tunable. Each optical reflective device is disposed in-line within an optical fiber extending between adjacent coils. Depending on the type of optical reflective device 18, it may be formed integrally with the optical fiber or spliced into the optical fiber. In a preferred embodiment, the optical reflective devices 18 are fiber Bragg gratings (FBGs). A FBG, as is known, reflects a predetermined wavelength band of light having a central peak reflection wavelength ($\lambda_b$), and passes the remaining wavelengths of the incident light (within a predetermined wavelength range). Accordingly, input light propagates along the fiber to the coils 16 and the FBGs 18 reflect particular wavelengths of light back along the fiber.

The isolation pad 20 or pads are each a sheet of material disposed between the optical reflective device 18 and the pipe 12 that substantially mechanically isolates the optical reflective device 18, thereby protecting it from external disturbances such as thermally and/or mechanically induced expansion of the pipe 12 and vibrations. Mechanical expansion of the pipe 12 can occur, for example, when the static pressure within the pipe 12 exceeds the ambient pressure surrounding the pipe 12. In those instances where the optical reflective device 18 is spliced within the optical fiber, the isolation pad is preferably disposed between the splice and the pipe 12. The isolation pad 20 is preferably a low bulk modulus material that can compress in response to thermal expansion of the pipe 12. The thickness of the pad 20 can be varied to suit the application at hand. Although the type of material will vary depending on the application, it is our experience that polyimide foams are a suitable isolation pad 20 material in petroleum well applications. The size of the pad can also be tailored to the application at hand. For example, FIG. 1 shows an isolation pad 20A that is disposed under the FBG 18 in a limited area bounding the FBG 18. The other FBGs 18 are mounted on isolation pads 20 that extend around some or all of the circumference of the pipe 12.

The characteristics of the pipe 12 are suited to the application at hand. If, for example, the sensors are optical pressure sensors 14 used to sense pressure variations within the pipe, the pipe 12 would have sufficient structural integrity to handle the pressure gradient across the pipe 12, and yet must also be able to deflect (i.e., change in circumference) an amount that will yield useful information. Other sensing applications may require other pipe characteristics.

To avoid interference from outside sources and to protect from the harsh environment inside the well, the array of sensors 14 is enclosed in a housing 22 attached to an exterior surface of the pipe 12. The housing 22 is formed from a sleeve 24 extending between a pair of bosses 26. A fiber optic cable 28 extends between the array 14 and remotely located instrumentation (not shown). The cable 28 passes through a sealable port 30 in one or both bosses 26 and connects with the array 14. In the preferred embodiment, the housing 22 and the pipe 12 together form a pressure vessel. The pressure within the pressure vessel may be greater than or less than the ambient pressure outside the housing 22. In other embodiments, the housing 22 is sealed to protect the array of sensors 14, but does not act as a pressure vessel. In a preferred embodiment, the housing 22 is filled with a gas such as, but not limited to, air, nitrogen, argon, etc.

Although the invention has been described and illustrated with respect to exemplary embodiments thereof, the foregoing and various other additions and omissions may be made therein and thereto without departing from the spirit and scope of the present invention. For example, the present apparatus has been described in the Detailed Description section as being mounted on a cylindrical pipe 12. The present apparatus is not limited to cylindrical conduits, and can be used with conduits having alternative cross-sectional geometries. In addition, the present invention is described above as having an array of sensors 14 that includes a plurality of optical fiber coils 16 and at least one optical reflective device 18, and one or more isolation pads 20. The isolation pads 20 as described herein have particular utility in protecting optical reflective devices, but are not limited to that application. In other instances, the isolation pads can be used to substantially mechanically isolate different types of sensors to protect them from mechanical strain and the like.

What is claimed is:

1. An apparatus for sensing fluid flow within a pipe, comprising:
   a sensing array for sensing fluid flow within the pipe, the sensing array having a plurality of optical fiber sensors;
   at least one optical reflective device disposed between adjacent sensors; and
   an isolation pad disposed between the optical reflective device and the pipe.

2. The apparatus of claim 1, further comprising a housing attached to an outer surface of the pipe to enclose the sensing array, the optical reflective device, and the isolation pad.

3. The apparatus of claim 2, wherein the isolation pad comprises a material that substantially isolates the optical reflective device from thermal growth of the pipe.

4. The apparatus of claim 2, wherein the isolation pad comprises a material that substantially isolates the optical reflective device from vibration.

5. The apparatus of claim 2, wherein the isolation pad comprises a material that substantially isolates the optical reflective device from mechanical growth of the pipe.

6. The apparatus of claim 2, wherein the isolation pad comprises a low bulk modulus material.

7. The apparatus of claim 6, wherein the isolation pad comprises a polyimide foam.

8. The apparatus of claim 7, wherein the optical reflective devices are fiber Bragg gratings.

9. The apparatus of claim 1, wherein a pair of splices connect the optical reflective device to an optical fiber extending between the adjacent sensors, and the isolation pad is disposed between the splices and the pipe.

10. The apparatus of claim 1, wherein the optical fiber sensors comprise optical fiber wraps around an outside surface of the pipe.

11. A sensing apparatus, comprising:
    a fiber optic sensor mounted on an outer surface of a conduit; and
    an isolation pad disposed between the sensor and the conduit outer surface,
    wherein the isolation pad isolates the sensor from expansion or vibration of the conduit.

12. The apparatus of claim 11, wherein the isolation pad substantially isolates the sensor from thermal growth of the conduit.

13. The apparatus of claim 12, wherein the isolation pad compresses in response to thermal growth of the conduit.

14. The apparatus of claim 11, wherein the isolation pad comprises a material that substantially isolates the sensor from vibration.

15. The apparatus of claim 11, wherein the isolation pad comprises a low bulk modulus material.

16. The apparatus of claim 15, wherein the isolation pad comprises a polyimide foam.

17. The apparatus of claim 11, further comprising a housing attached to an outer surface of the pipe to enclose the sensor and the isolation pad.

18. A method for constructing an apparatus for sensing fluid flow within a pipe, comprising:
    positioning a fiber optic sensing array comprising a plurality of sensors around the pipe;
    coupling a fiber optic reflective element between adjacent sensors; and
    positioning an isolation pad between the fiber optic reflective device and the pipe.

19. The method of claim 18, further comprising attaching a housing to the outer surface of the pipe to enclose the sensing array, the fiber optic reflective device, and the isolation pad.

20. The method of claim 18, wherein the isolation pad comprises a material that substantially isolates the optical reflective device from growth of the pipe.

21. The method of claim 18, wherein the isolation pad comprises a material that substantially isolates the optical reflective device from vibration.

22. The method of claim 18, wherein the isolation pad comprises a polyimide foam.

23. The method of claim 18, wherein the fiber optic reflective device is a fiber Bragg gratings.

24. The method of claim 16, further comprising splicing the fiber optic reflective element to the adjacent sensors, and positioning the isolation pad between the splices and the pipe.

25. The apparatus of claim 16, wherein the sensors comprise fiber optic wraps around an outside surface of the pipe.

* * * * *